(12) United States Patent
Murata et al.

(10) Patent No.: US 11,358,645 B2
(45) Date of Patent: Jun. 14, 2022

(54) VEHICLE BODY STRUCTURE MEMBER

(71) Applicant: Toyota Jidosha Kabushiki Kaisha, Toyota (JP)

(72) Inventors: Soshiro Murata, Nagoya (JP); Ayaka Kagami, Inazawa (JP); Takashi Sagisaka, Miyoshi (JP); Yu Sasaki, Okazaki (JP); Shinichi Arimoto, Okazaki (JP); Koh Hirokawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/721,072

(22) Filed: Dec. 19, 2019

(65) Prior Publication Data

US 2020/0231217 A1 Jul. 23, 2020

(30) Foreign Application Priority Data

Jan. 23, 2019 (JP) .............................. JP2019-009622

(51) Int. Cl.
*B62D 21/15* (2006.01)
*B62D 25/20* (2006.01)
*B62D 25/08* (2006.01)
*B62D 29/00* (2006.01)

(52) U.S. Cl.
CPC ........... *B62D 21/155* (2013.01); *B62D 25/08* (2013.01); *B62D 25/20* (2013.01); *B62D 21/152* (2013.01); *B62D 29/008* (2013.01)

(58) Field of Classification Search
CPC ...... B62D 21/155; B62D 25/08; B62D 25/20; B62D 29/008; B62D 21/152

USPC ..................................................... 296/187.08
See application file for complete search history.

(56) References Cited

U.S. PATENT DOCUMENTS

| | | | |
|---|---|---|---|
| 6,296,300 B1 | 10/2001 | Sato | |
| 9,216,775 B2 * | 12/2015 | Ohhama | ............... B62D 29/008 |
| 2006/0284449 A1 | 12/2006 | Miyahara | |
| 2015/0061320 A1 * | 3/2015 | Yabu | .................... B62D 25/082 |
| | | | 296/187.1 |
| 2015/0166104 A1 | 6/2015 | Ohhama et al. | |
| 2016/0236715 A1 * | 8/2016 | Kurokawa | ............. B62D 25/14 |
| 2017/0001667 A1 | 1/2017 | Ashraf et al. | |
| 2017/0073010 A1 | 3/2017 | Alanis et al. | |

FOREIGN PATENT DOCUMENTS

| | | |
|---|---|---|
| CN | 204567770 U | 8/2015 |
| CN | 207644466 U | 7/2018 |
| CN | 208119277 U | 11/2018 |
| DE | 102004054850 A1 | 1/2006 |
| DE | 102013221512 A1 | 4/2015 |
| DE | 112013003701 T5 | 4/2015 |
| EP | 3699063 A1 | 8/2020 |
| JP | 2001-030961 A | 2/2001 |
| JP | 2012-136195 A | 7/2012 |

\* cited by examiner

*Primary Examiner* — D Glenn Dayoan
*Assistant Examiner* — Dana D Ivey
(74) *Attorney, Agent, or Firm* — Dinsmore & Shohl LLP

(57) ABSTRACT

Provided is a vehicle body structure member molded by a die. The vehicle body structure member includes a general portion constituting a main part of the vehicle body structure member, and ribs provided in a standing manner from the general portion and extended along the input direction of a collision load.

11 Claims, 5 Drawing Sheets

VEHICLE BODY STRUCTURE MEMBER

CROSS-REFERENCE TO RELATED APPLICATIONS

This application claims priority to Japanese Patent Application No. 2019-009622 filed on Jan. 23, 2019, which is incorporated herein by reference in its entirety including the specification, drawings and abstract.

BACKGROUND

1. Technical Field

The present disclosure relates to a vehicle body structure member.

2. Description of Related Art

Japanese Unexamined Patent Application Publication No. 2001-030961 (JP 2001-030961 A) describes a technique related to a vehicle body structure in which a front side member is connected to a floor member via a member (hereinafter referred to as "vehicle body structure member") formed by aluminum die-casting and having a closed section portion. In the above related art, ribs are formed in a truss shape in the closed section portion of the vehicle body structure member and improve rigidity.

SUMMARY

However, in the related art, when a collision load is input into the vehicle body structure member along the vehicle front-rear direction, the closed section portion might greatly bend and deform due to the occurrence of a bending moment.

In consideration of the above fact, the present disclosure provides a vehicle body structure member that can restrain bending deformation at die time of input of a collision load.

A vehicle body structure member according to one aspect of the present disclosure is a vehicle body structure member molded by a die, and the vehicle body structure member includes a general portion and ribs. The general portion constitutes a main part of the vehicle body structure member. The ribs are provided in a standing manner from the general portion and extended along the input direction of a collision load.

In the above aspect, the ribs may be extended along the transmission direction of die collision load.

When the ribs are extended in the general portion of the vehicle body structure member, the vehicle body structure member is reinforced, so that the rigidity of the vehicle body structure member can be improved. When the rigidity of the vehicle body structure member is improved, the vehicle body structure member can be restrained from bending and deforming at the time when a collision load is input into the vehicle body structure member.

Further, in the above aspect, the ribs are extended along the input direction of the collision load. As a comparative example, in a case where the ribs are extended along directions crossing the input direction of the collision load, when a bending moment occurs in the vehicle body structure member and the vehicle body structure member bends and deforms at the time when the collision load is input into the vehicle body structure member, a collision energy might not be absorbed sufficiently.

In contrast, in the above aspect, the ribs are extended along the input direction of the collision load as described above. Accordingly, when the collision load is input into the vehicle body structure member, the collision load is transmitted along the ribs. Hereby, the ribs can be axially compressed. As such, when the ribs are axially compressed, the collision energy is effectively absorbed due to deformation (elastic deformation and plastic deformation) of the ribs.

With the configuration, it is possible to yield such an effect that bending deformation can be restrained at the time of input of a collision load.

In the above aspect, the vehicle body structure member may be disposed along the vehicle front-rear direction, and the vehicle body structure member may have an arch shape curving along the vehicle up-down direction or curving along the vehicle width direction.

On this account, when a collision load is input into the vehicle body structure member along the vehicle front-rear direction due to a front end collision of the vehicle (hereinafter referred to as "the front collision of the vehicle") or a rear end collision of the vehicle (hereinafter referred to as "the rear collision of the vehicle"), a bending moment is generated in the vehicle body structure member because the vehicle body structure member is formed into a so-called arch shape.

Accordingly, in the vehicle body structure member formed in an arch shape, the ribs provided in a standing manner from the general portion of the vehicle body structure member are extended along the input direction (the vehicle front-rear direction) of the collision load, so that the occurrence of a bending moment is restrained at the time of input of a collision load, thereby making it possible to restrain bending deformation of the vehicle body structure member.

With the configuration, it is possible to yield such an effect that the bending deformation can be restrained.

In the above aspect, the ribs may be extended along the vehicle front-rear direction.

In the above configuration, the ribs are extended along the vehicle front-rear direction. Accordingly, when a collision load is input into the vehicle body structure member along the vehicle front-rear direction due to the front collision of the vehicle or the rear collision of the vehicle, the collision load is transmitted along the ribs, so that the ribs can be axially compressed. As such, when the ribs are axially compressed, it is possible to absorb the collision energy effectively.

With the configuration, it is possible to yield such an effect that a larger collision energy can be absorbed by a predetermined stroke.

In the above aspect, the vehicle body structure member may further include a side wall portion provided in a standing manner from an outer edge of the general portion and connected to the ribs.

In the above configuration, the side wall portions provided in a standing manner from the outer edges of the general portion and connected to the ribs are further provided. Accordingly, the vehicle body structure member is further reinforced, so that the rigidity of the vehicle body structure member can be further improved.

With the configuration, it is possible to yield such an effect that the rigidity of the vehicle body structure member can be further improved.

In the above aspect, the ribs may be continued with the side wall portion along the vehicle front-rear direction.

In the above configuration, the ribs are continued with the side wall portion along the vehicle front-rear direction. Accordingly, the side wall portion and the ribs are integrated with each other in the vehicle front-rear direction so as to serve as a part of a load transmission member. Further, since the ribs and the side wall portion are continued along the vehicle front-rear direction, the side wall portion can double as parts of the ribs. Hereby, in comparison with a case where ribs are extended separately from the side wall portion, it is not necessary to extend new ribs, so that the vehicle body structure member can be accordingly reduced in weight.

With the configuration, it is possible to yield such an effect that the rigidity of the vehicle body structure member is improved and the vehicle body structure member can be reduced in weight.

In the above aspect, the vehicle body structure member may be disposed along the vehicle front-rear direction and have an arch shape curving along the vehicle up-down direction. The ribs may be placed above a height position, in the vehicle up-down direction, of a centroid of a section of the vehicle body structure member cut along directions crossing the vehicle front-rear direction in each end of the vehicle body structure member in the vehicle front-rear direction. The ribs may be placed below a height position, in the vehicle up-down direction, of a centroid of a section of the vehicle body structure member cut along die directions crossing the vehicle front-rear direction in a central part of the vehicle body structure member in the vehicle front-rear direction.

In the above configuration, the vehicle body structure member is disposed along the vehicle front-rear direction and has an arch shape curving along the vehicle up-down direction. That is, a front part and a rear part of the vehicle body structure member in the vehicle front-rear direction are placed below, in the vehicle up-down direction, the central part of the vehicle body structure member in the vehicle front-rear direction.

On this account, in the opposite ends of the vehicle body structure member in the vehicle front-rear direction, the ribs are placed above the height position, in the vehicle up-down direction, of the centroid of a section of the vehicle body structure member cut along directions (hereinafter referred to as "the vehicle up-down direction and the vehicle width direction") crossing the vehicle front-rear direction. In the meantime, in the central part of the vehicle body structure member in the vehicle front-rear direction, the ribs are placed below the height position, in the vehicle up-down direction, of the centroid of a section of the vehicle body structure member cut along the vehicle up-down direction and the vehicle width direction.

That is, in the vehicle body structure member having an arch shape curving along the vehicle up-down direction, the height positions of the ribs in the vehicle up-down direction are adjusted in the opposite ends and the central part of the vehicle body structure member in the vehicle front-rear direction, so that the height positions, in the vehicle up-down direction, of the centroids in respective sections of the vehicle body structure member in the vehicle front-rear direction can be generally uniform. Hereby, it is possible to restrain the occurrence of a bending moment in the vehicle body structure member at the time of the front collision of the vehicle or the rear collision of the vehicle.

With the configuration, it is possible to yield such an effect that the occurrence of the bending moment can be restrained at the time of the front collision of the vehicle or the rear collision of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Tim following describes a vehicle body structure member according to one embodiment of the present disclosure. Note that an arrow FR shown appropriately in each figure indicates the front side in the vehicle front-rear direction, and an arrow UP indicates the upper side in the vehicle up-down direction. Further, an arrow OUT indicates an outer side in the vehicle width direction. Hereinafter, in a case where a description is made by use of merely directions of front and rear, right and left, and up and down, they indicate front and rear in the vehicle front-rear direction, right and left in the vehicle right-left direction (the vehicle width direction), and up and down in the vehicle up-down direction, respectively, unless otherwise specified.

Configuration of Vehicle Body Structure Member

First described is a configuration of a vehicle to which a vehicle body structure member according to the present embodiment is applied.

Figure 1:
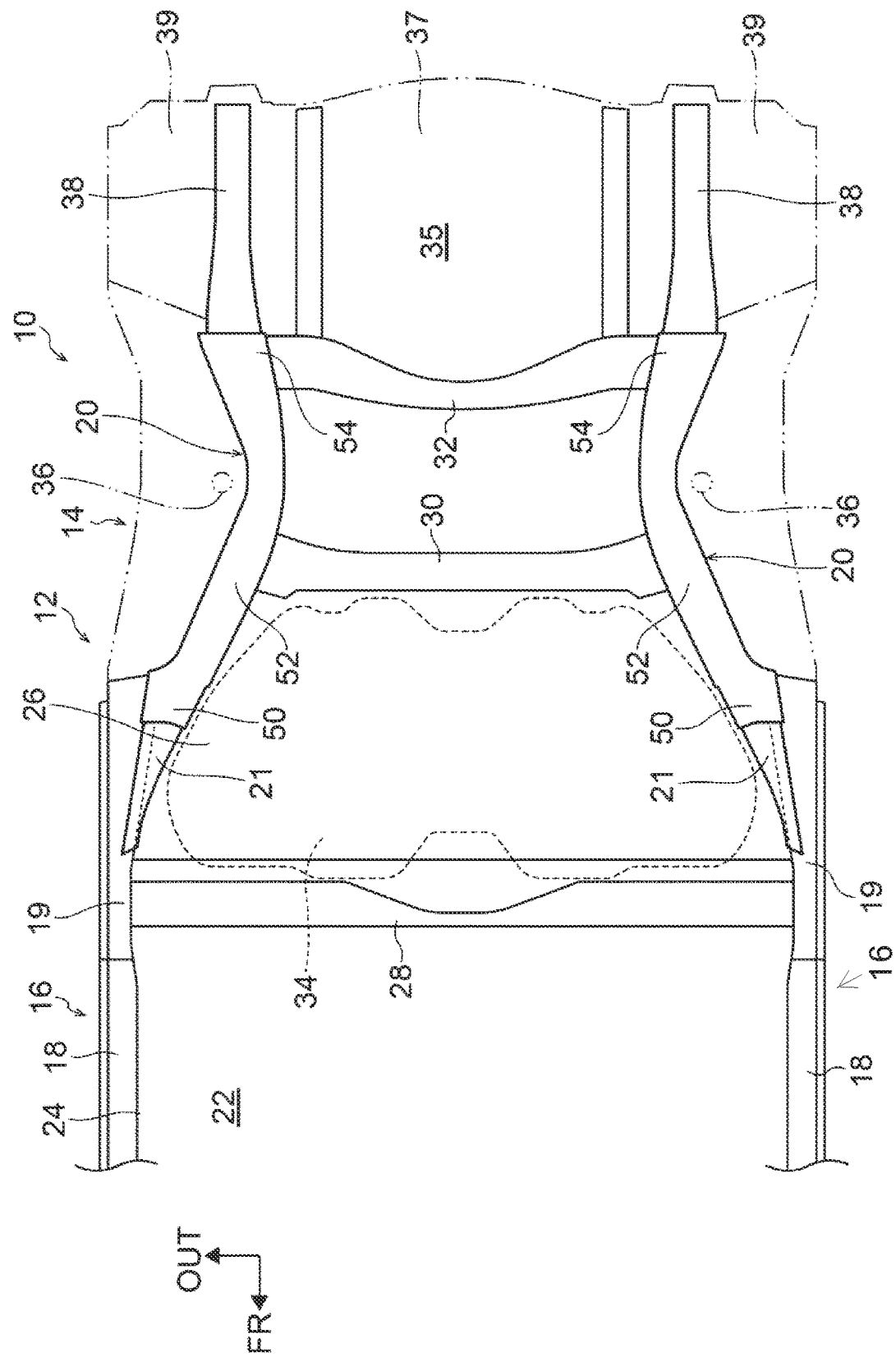
FIG. 1 is a plan view illustrating a rear portion side of a vehicle lower portion including a rear-floor side member to which a vehicle body structure member according to one embodiment of the present disclosure is applied.

FIG. 1 is a plan view illustrating a rear portion (hereinafter referred to as "vehicle rear portion") 14 side of a vehicle 10 in a lower portion (hereinafter referred to as "vehicle lower portion") 12 of the vehicle 10 to which a vehicle body structure member according to the present embodiment is applied.

As illustrated in FIG. 1, right and left rockers 18 extending longitudinally in the vehicle front-rear direction are provided in respective side portions (hereinafter referred to as "vehicle side portion") 16 of the vehicle 10. Sectional shapes of the right and left rockers 18 when the rockers 18 are cut along a direction (the vehicle up-down direction and the vehicle width direction) perpendicular to the longitudinal direction of the rockers 18 are a closed section shape, and each of the rockers 18 constitutes a part of a framework of its corresponding vehicle side portion 16.

A floor panel 24 extending along the vehicle front-rear direction and the vehicle width direction and constituting a floor face of a vehicle cabin (cabin) 22 is provided between the right and left rockers 18, and the opposite ends of the floor panel 24 in the vehicle width direction are connected to the right and left rockers 18, respectively. Further, a floor cross member 28 is disposed on the rear side of the rockers 18 in the vehicle front-Tear direction so as to extend along the vehicle width direction between the right and left rockers 18. The floor cross member 28 is connected to the upper side of the floor panel 24.

Further, rear-floor side members 20 are disposed behind the right and left rockers 18 in the vehicle front-rear direction so as to extend along the vehicle front-rear direction. A center floor panel 26 constituting a floor face on the rear side of the vehicle cabin 22 is provided between the right and left rear-floor side members 20. The center floor panel 26 is placed behind the floor panel 24 in the vehicle front-rear direction and extends along the vehicle front-rear direction and the vehicle width direction. The opposite end portions of the center floor panel 26 in the vehicle width direction are connected to the right and left rear-floor side members 20, respectively.

Further, in central parts 52 of the rear-floor side members 20 in the vehicle front-rear direction, the floor cross member 30 is disposed along the vehicle width direction between the right and left rear-floor side members 20, and the floor cross member 30 is connected to the upper side of the center floor panel 26.

Further, rear parts 54 of the rear-floor side members 20 in the vehicle front-rear direction are provided with a floor cross member 32 such that the floor cross member 32 is disposed along the vehicle width direction between the right and left rear-floor side members 20. Similarly to the floor cross member 50, the floor cross member 32 is also connected to the upper side of the center floor panel 26.

Note that a fuel tank 34 is disposed below the center floor panel 26 on front-part-50 sides of the right and left rear-floor side members 20 in the vehicle front-rear direction, that is, between the floor cross member 28 and the floor cross member 30. Further, although not illustrated herein, suspension towers 36 and so on to which a shock absorber is attached are provided on outer sides of the right and left rear-floor side members 20 in the vehicle width direction.

Further, rear-floor side member rears 38 are extended along the vehicle front-rear direction behind the right and left rear-floor side members 20 in the vehicle front-rear direction. Further, a rear floor panel 37 extending along the vehicle front-rear direction and the vehicle width direction and constituting a floor face inside a trunk 35 is provided behind the center floor panel 26 in the vehicle front-rear direction. Respective rear floor side panels 39 extending along the vehicle front-rear direction and the vehicle width direction are provided on the opposite outer sides of the rear floor panel 37 in the vehicle width direction, and the right and left rear-floor side member rears 38 are connected to the rear-floor side panels 39, respectively, Rear-Floor Side Members The following describes the rear-floor side members 20 as the vehicle body structure member according to the present embodiment in detail. A basic configuration of the rear-floor side member 20 will be described first, and subsequently, a part of the rear-floor side member 20 will be described.

Basic Configuration of Rear-Floor Side Member

Figure 2:
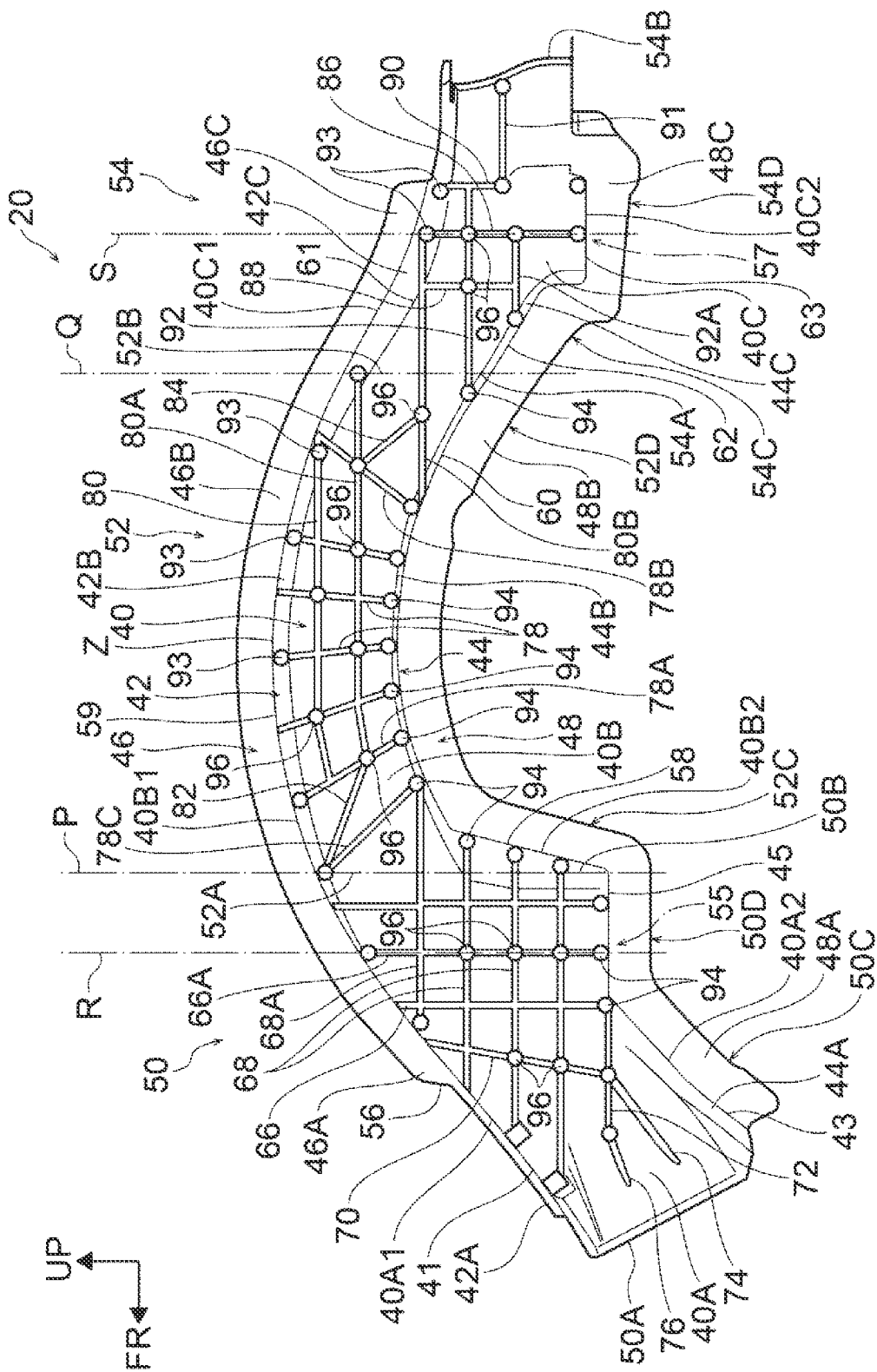
FIG. 2 is a side view illustrating the rear-floor side member to which the vehicle body structure member according to one embodiment of the present disclosure is applied.

As illustrated in FIG. 1, the rear-floor side member 20 curves to project inwardly in the vehicle width direction in a plan view, and as illustrated in FIG. 2, the rear-floor side member 20 curves to project upward in the vehicle up-down direction in a side view of the rear-floor side member 20 (a so-called arch shape). Note that FIG. 2 is a side view of the rear-floor side member 20.

The rear-floor side member 20 is formed by aluminum die-casting, and a die that is opened along the vehicle width direction of the rear-floor side member 20 is used. Further, the section of the rear-floor side member 20 taken along the vehicle up-down direction and the vehicle width direction has a hat shape having an opening that is opened outwardly in the vehicle width direction.

That is, briefly speaking, the rear-floor side member 20 is constituted by an inner wall portion (a general portion) 40 that constitutes a main part of the rear-floor side member 20, a pair of side wall portions 42, 44 provided in a standing manner from outer edges of the inner wall portion 40 such that the side wall portions 42, 44 face each other, and flange portions 46, 48 extending from respective distal ends of the side wall portions 42, 44.

For purposes of this description, the rear-floor side member 20 will be described by dividing the rear-floor side member 20 into a front part 50, a central part 52, and a rear part 54 along the vehicle front-rear direction. Note that, in the rear-floor side member 20 illustrated in FIG. 2, a straight line P illustrated along the up-down direction indicates a boundary between the front part 50 and the central part 52 of the rear-floor side member 20, and a straight line Q indicates a boundary between the central part 52 and the rear part 54 of the rear-floor side member 20. In the following description, the straight line P is referred to as "boundary line P," and the straight line Q is referred to as "boundary line Q."

Although not illustrated in the figure, so-called suspension member attachment portions 55, 57 to which respective suspension members are attached are provided respectively in the front part 50 and the rear part 54 of the rear-floor side member 20, and center lines R, S illustrated in the front part 50 and the rear part 54 indicate axial center lines of the suspension member attachment portions 55, 57, respectively. Hereinafter, the center line R is referred to as "axial center line R," and the center line S is referred to as "axial center line S."

Front Part of Rear-Floor Side Member

First described is the front part 50 of the rear-floor side member 20 (hereinafter referred to as "rear-floor side member front part 50").

As illustrated in FIG. 1, the rear-floor side member front part (an end portion of the vehicle body structure member in the vehicle front-rear direction) 50 is connected to the rocker 18 extending in the vehicle front-rear direction in the vehicle side portion 16. Note that a rocker rear 19 as a separate member may be provided in a rear part of the rocker 18 in the vehicle front-rear direction. Further, in the rear-floor side member 20, a connecting portion 21 to be connected to the rocker 18 may be separately provided in the rear-floor side member front part 50.

As illustrated in FIG. 2, the rear-floor side member front part 50 is constituted by an inner wall portion 40A, side wall portions 42A, 44A, and flange portions 46A, 48A. An upper end 40A1 of the inner wall portion 40A is provided with an inclined portion 41 inclined from a front end 50A to a rear end 50B of die rear-floor side member front part 50 so as to form a gradual curve toward the upper side in the vehicle up-down direction as it goes rearward in the vehicle front-rear direction.

In the meantime, in the rear-floor side member front part 50, a front part 50C side and a rear part 50D side of a bottom end 40A2 of the inner wall portion 40A in the vehicle front-rear direction have different shapes. More specifically, the front part 50C side of the bottom aid 40A2 of the inner wall portion 40A is provided generally in parallel with the upper end 40A1 of the inner wall portion 40A and is provided with an inclined portion 43 inclined so as to form a gradual curve toward the upper side in the vehicle up-down direction as it goes rearward in the vehicle front-rear direction. On the other hand, the rear part 50D side of the bottom end 40A2 of the inner wall portion 40A is provided with a horizontal portion 45 extending along the horizontal direction toward the rear side in the vehicle front-rear direction.

The side wall portions 42A, 44A are provided outwardly in the vehicle width direction from the upper end 40A1 and the bottom end 40A2 of the inner wall portion 40A so as to extend along respective shapes of the upper end 40A1 and the bottom end 40A2. That is, the side wall portion 42A includes the inclined portion 41, and the side wall portion 44A includes the inclined portion 43 and the horizontal portion 45.

Further, the flange portion 46A is extended upward in the vehicle up-down direction from the distal end of the side wall portion 42A along the shape of the side wall portion 42A, and the flange portion 48A is extended downward in the vehicle up-down direction from the distal end of the side wall portion 44A along the shape of the side wall portion 44A. Note that, in the flange portion 46A, the front part 50C side of the rear-floor side member front part 50 is cut (a notch 56). Further, in the inclined portion 43 of the side wall portion 44A, the flange portion 48A extends rearward in the vehicle front-rear direction and downward in the vehicle up-down direction.

Central Part of Rear-Floor Side Member

Next will be described the central part 52 of the rear-floor side member 20 (hereinafter referred to as "rear-floor side member central part 52").

As illustrated in FIG. 2, the rear-floor side member central part (a central part of the vehicle body structure member in the vehicle front-rear direction) 52 is constituted by an inner wall portion 40B, side wall portions 42B, 44B, and flange portions 46B. 48B. An upper end 40B1 of the inner wall portion 40B is provided with a curved portion 59 projecting upward in the vehicle up-down direction from a front end 52A to a rear end 52B of the rear-floor side member central part 52.

In the meantime, a bottom end 40B2 of the inner wall portion 40B is provided with a steep gradient portion 58 in a front part 52C of the rear-floor side member central part 52 such that the steep gradient portion 58 is sharply inclined upward in the vehicle up-down direction as it goes rearward in the vehicle front-rear direction. Further, the bottom end 40B2 of the inner wall portion 40B is provided with a curved portion 60 provided generally in parallel with the upper end 40B1 of the inner wall portion 40B from the steep gradient portion 58 to the rear end 52B of the rear-floor side member central part 52 such that the curved portion 60 projects upward in the vehicle up-down direction in a curved shape.

The side wall portions 42B, 44B are provided outwardly in the vehicle width direction from the upper end 40B1 and the bottom end 40B2 of the inner wall portion 40B so as to extend along respective shapes of the upper end 40B1 and the bottom end 40B2. That is, the side wall portion 42B includes a curved portion 59, and the side wall portion 44B includes the steep gradient portion 58 and the curved portion 60.

Further, the flange portion 46B is extended upward in the vehicle up-down direction from the distal end of tire side wall portion 42B along the shape of the side wall portion 42B, and the flange portion 48B is extended downward in the vehicle up-down direction from the distal end of the side wall portion 44B along the shape of the side wall portion 44B. Note that, in the steep gradient portion 58 of the side wall portion 44B, the flange portion 48B is extended rearward in the vehicle front-rear direction and downward in the vehicle up-down direction.

Rear Part of Rear-Floor Side Member

Next will be described the rear part 54 of the rear-floor side member 20 (hereinafter referred to as "rear-floor side member rear part 54").

As illustrated in FIG. 1, the rear-floor side member rear part (an end portion of the vehicle body structure member in the vehicle front-rear direction) 54 is connected to the rear-floor side member rear 38 extending in the vehicle front-rear direction in the vehicle rear portion 14. As illustrated in FIG. 2, the rear-floor side member rear part 54 is constituted by an inner wall portion 40C, side wall portions 42C, 44C, and flange portions 46C, 48C. An upper end 40C1 of the inner wall portion 40C is provided with a curved portion 61 slightly projecting downward in the vehicle up-down direction from a front end 54A to a rear end 54B of the rear-floor side member rear part 54.

In the meantime, a bottom end 40C2 of the inner wall portion 40C is provided with an inclined portion 62 in a front part 54C of the rear-floor side member rear part 54 such that the inclined portion 62 is inclined downward in the vehicle up-down direction as it goes rearward in the vehicle front-rear direction. Further, the bottom end 40C2 of the inner wall portion 400 is provided with a horizontal portion 63 in a rear part 54D of the rear-floor side member rear part 54 such that the horizontal portion 63 extends generally along the horizontal direction as it goes rearward in the vehicle front-rear direction.

The side wall portions 42C, 44C are provided outwardly in the vehicle width direction from the upper end 40C1 and the bottom end 40C2 of the inner wall portion 40C so as to extend along respective shapes of the upper end 40C1 and the bottom end 40C2. That is, the side wall portion 42C includes the curved portion 61, and the side wall portion 44C includes the inclined portion 62 and the horizontal portion 63. Further, the flange portion 46C is extended upward in the vehicle up-down direction from the distal end of the side wall portion 42C along the shape of the side wall portion 42C, and the flange portion 48C extends downward in the vehicle up-down direction from the distal end of the side wall portion 44C along the shape of the side wall portion 44C.

Part of Rear-Floor Side Member

In the meantime, in the present embodiment, as illustrated in FIG. 2, the inner wall portion 40 is provided with plate-shaped longitudinal ribs 66, 78, 86 and the like extended along the vehicle up-down direction and plate-shaped cross ribs (ribs) 68, 80, 92 and the like extended along the vehicle up-down direction such that the longitudinal ribs 66, 78, 86 and the like and the cross ribs 68, 80, 92, and the like are disposed to extend front the side wall portion 42 to the side wall portion 44 and arranged generally perpendicularly to each other. Note that the longitudinal ribs 66, 78, 86 and the like and the cross ribs 68, 80, 92 and the like are set to have generally the same plate thickness. The longitudinal ribs 66, 78, 86, the cross ribs 68, 80, 92, and the like will be described below in detail.

Front Part of Rear-Floor Side Member

First described is the rear-floor side member front part 50 side (a region from the front end 50A of the rear-floor side member front part 50 to the front end 52A (the boundary line P) of the rear-floor side member central part 52).

A plurality of longitudinal ribs 66 is provided in the rear-floor side member front part 50. The longitudinal ribs 66 are disposed to extend from the side wall portion 42A to the horizontal portion 45 of the side wall portion 44A in the rear-floor side member front part 50. Here, a longitudinal rib 66A placed in the center among the longitudinal ribs 66 is provided at a position overlapping with the axial center line R of the aforementioned suspension member attachment portion 55 in a vehicle side view. Further, a longitudinal rib 70 is provided on the inclined portion 43 side of the side wall portion 44A, and the longitudinal rib 70 is disposed to extend from the side wall portion 42A to a cross rib 72 (described later).

Further, in the rear-floor side member front part 50, a plurality of cross ribs (ribs) 68 is provided so as to be generally perpendicular to the aforementioned longitudinal ribs 66. The cross ribs 68 are extended along the vehicle front-rear direction from the rear-floor side member front part 50 to the front part 52C of the rear-floor side member central part 52 such that the cross ribs 68 are disposed to extend from the side wall portion 42A of the rear-floor side member front part 50 to the side wall portion 44B of the rear-floor side member central part 52.

Further, the front part 50C of the rear-floor side member front part 50 is provided with inclined ribs 74, 76 between the side wall portion 42A and the side wall portion 44A such that the inclined ribs 74, 76 are placed generally in parallel with the side wall portions 42A, 44A. The inclined rib 74 is connected to the longitudinal rib 70 and the cross rib 72, and the inclined rib 76 is connected to the cross rib 72.

Central Part of Rear-Floor Side Member

Next will be described the rear-floor side member central part 52 side (a region from the front end 52A (the boundary line P) of the rear-floor side member central part 52 to the front end 54A (the boundary line Q) of the rear-floor side member rear part 54) illustrated in FIG. 2.

A plurality of longitudinal ribs 78 is provided in the rear-floor side member central part 52. The longitudinal ribs 78 are provided near a top Z of the rear-floor side member central part 52 at predetermined intervals along the vehicle front-rear direction. The longitudinal ribs 78 are disposed to extend from the side wall portion 42B to the side wall portion 44B of the rear-floor side member central part 52 and are placed so as to extend radially from generally the center of curvature of the curved portion 60 of the side wall portion 44B.

A plurality of cross ribs 80 is disposed to extend along the vehicle front-rear direction from a longitudinal rib 78A placed on the front side to a longitudinal rib 78B placed on the rear side among the longitudinal ribs 78. A longitudinal rib 78C is provided in front of the longitudinal rib 78A, and the longitudinal rib 78C is disposed to extend from the side wall portion 42B to the side wall portion 44B.

Further, an inclined rib 82 connected to the side wall portion 42B and inclined downward in the vehicle up-down direction as it goes rearward in the vehicle front-rear direction is disposed to extend from the longitudinal rib 78C to the longitudinal rib 78A. Note that the inclined rib 82 is also connected to the side wall portion 42B and a cross rib (rib) 80A (described later).

In the meantime, among the cross ribs 80, a cross rib 80A placed in the center of the rear-floor side member central part 52 in the vehicle up-down direction extends to the side wall portion 42B across the longitudinal rib 78B. Further, a cross rib 80B placed below the cross rib 80A extends from the side wall portion 44B to the side wall portion 42C of the rear-floor side member rear part 54 (described later). Note that an inclined rib 84 connected to the longitudinal rib 78B and inclined downward in the vehicle up-down direction as it goes rearward in the vehicle front-rear direction is disposed to extend from the cross rib 80A to the cross rib 80B.

Rear Part of Rear-Floor Side Member

Next will be described the rear-floor side member rear pail 54 side (a region from the front end 54A to the rear end 54B of the rear-floor side member rear part 54) illustrated in FIG. 2.

A longitudinal rib 86 is provided in the rear-floor side member rear part 54. The longitudinal rib 86 is disposed to extend from the side wall portion 42C to the side wall portion 44C in the rear-floor side member rear part 54. Here, the longitudinal rib 86 is provided at a position overlapping with the axial center line S of the aforementioned suspension member attachment portion 57 in a vehicle side view. Further, longitudinal ribs 88, 90 are provided in front of and behind the longitudinal rib 86. The longitudinal rib 88 is disposed to extend from the side wall portion 42C to a cross rib (rib) 92A (described below), and the longitudinal rib 90 is disposed to extend from the side wall portion 42C to a cross rib (rib) 91 (described below).

Further, in the rear-floor side member rear part 54, the cross ribs 80B, 92, 92A are provided so as to be generally perpendicular to the aforementioned longitudinal ribs 86, 88, 90. The cross rib 80B is provided from the front part 54C of the rear-floor side member rear part 54 to the rear part 52D of the rear-floor side member central part 52 such that the cross rib 80B is disposed to extend from the side wall portion 44B of the rear-floor side member central part 52 to the side wall portion 42C of the rear-floor side member rear part 54. Further, the cross rib 92 is provided so as to connect the side wall portion 44C to the longitudinal ribs 86, 88, 90, and the cross rib 92A is provided so as to connect the side wall portion 44C to the longitudinal ribs 86, 88.

Figure 3:
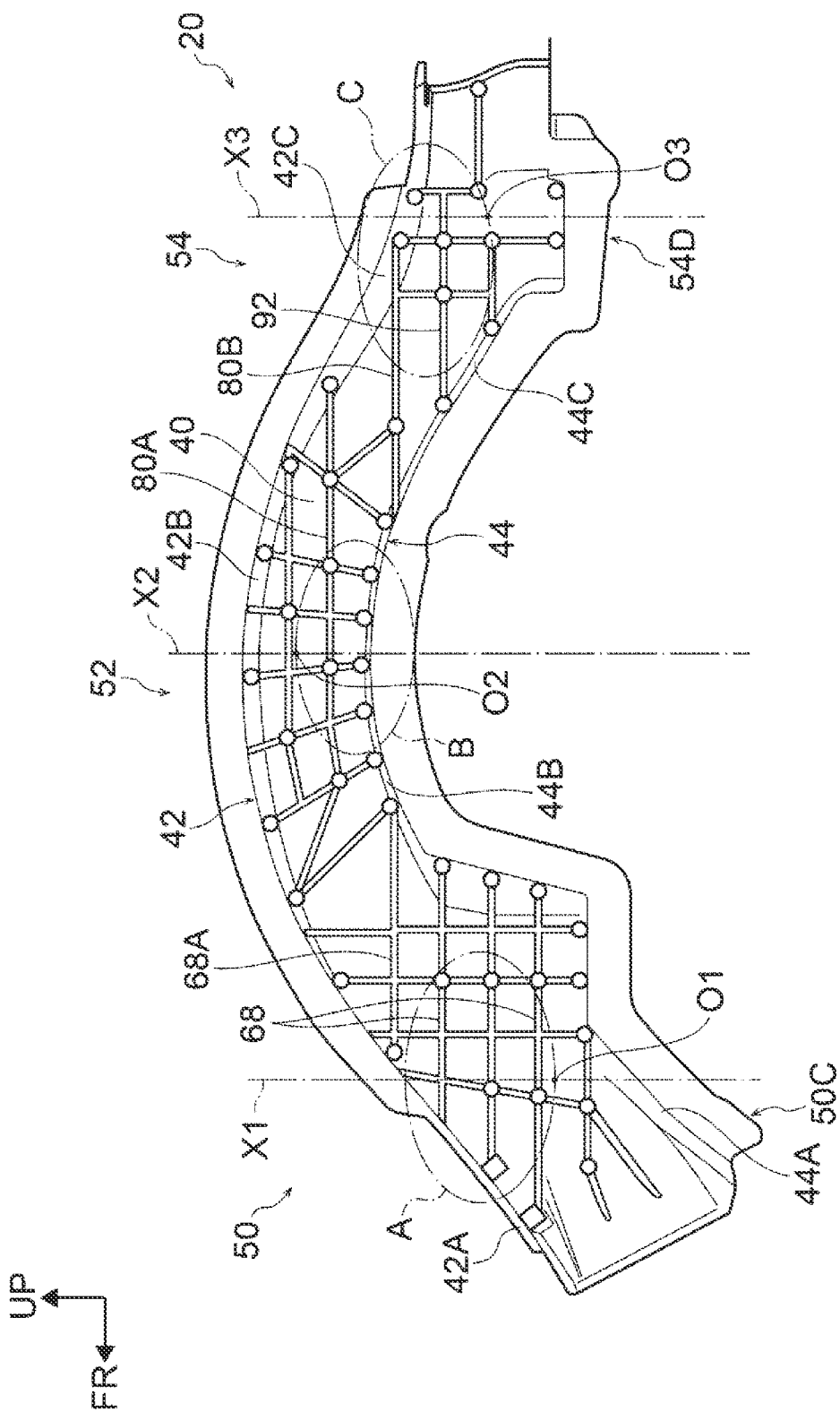
FIG. 3 is a side view of the rear-floor side member to describe the arrangement of ribs provided in the rear-floor side member to which the vehicle body structure member according to one embodiment of the present disclosure is applied.

Here, FIG. 3 is a side view of the rear-floor side member 20. As illustrated in FIG. 3, in the rear-floor side member front pan 50, the centroid of a section cut along directions (the vehicle up-down direction and the vehicle width direction) crossing the vehicle front-rear direction of the rear-floor side member 20, that is, a section of the rear-floor side member 20 at a predetermined position X1 along the vehicle front-rear direction is indicated by O1. Further, in the rear-floor side member central part 52, the centroid of a section at a predetermined position X2 along the vehicle front-rear direction is indicated by O2. Further, in the rear-floor side member rear part 54, the centroid of a section at a predetermined position X3 along the vehicle front-rear direction is indicated by O3.

Further, in the present embodiment, in the rear-floor side member from part 50, the cross ribs 68 are placed above the centroid O1 of the section at the predetermined position X1 in the vehicle up-down direction (a region A). Further, in the rear-floor side member central part 52, the cross rib 80A is placed below the centroid O2 of the section at the predetermined position X2 in the vehicle up-down direction (a region B). Further, in the rear-floor side member rear part 54, the cross ribs 80B, 92 are placed above the centroid O3 of the section at the predetermined position X3 in the vehicle up-down direction (a region C).

In the meantime, in the present embodiment, the rear-floor side member 20 is formed by aluminum die-casting as described above, and a die (not shown) for molding the rear-floor side member 20 is configured to be opened along the vehicle width direction in the rear-floor side member 20.

The rear-floor side member 20 is molded by the die, and the rear-floor side member 20 is released from the die in a state where the die is opened. Accordingly, a fixed die side constituting a part of the die is provided with ejector pins, although not illustrated herein. When the ejector pins abut with the rear-floor side member 20 and presses the rear-floor side member 20, the rear-floor side member 20 is released from the fixed die.

On this account, the rear-floor side member 20 is provided with ejector pin seats with which the ejector pins abut. More specifically, in the present embodiment, a plurality of columnar ejector pin seats 93, 94, 96 is provided in a standing manner from the inner wall portion 40 of the rear-floor side member 20. Note that the diameters of the ejector pin seats 93, 94, 96 are set to be larger than the plate thicknesses of the longitudinal ribs 66, 78 and the cross ribs 68, 80 and the like.

The ejector pin seats 93 are provided at intersections of at least the longitudinal rib 66A, 86 with the side wall portion 42 and also at other intersections of the longitudinal ribs 66, 78 or the cross ribs 68, 80, 92 with the side wall portion 42. The ejector pin seats 93 are provided integrally with the side wall portion 42.

Further, the ejector pin seats 94 are provided at intersections of at least the longitudinal rib 66A, 86 with the side wall portion 44 and also at intersections of the longitudinal ribs 66, 78 or the cross ribs 68, 72, 92 with the side wall portion 44. The ejector pin seats 94 are provided integrally with the side wall portion 44.

Further, the ejector pin seats 96 are provided at some intersections among a plurality of intersections where the longitudinal ribs 66, 70 cross the cross ribs 68, some intersections among a plurality of intersections where the longitudinal ribs 78 cross the cross ribs 80, and so on.

As described above, the ejector pin seats 93 are provided integrally with the side wall portion 42, the ejector pin seats 94 are provided integrally with the side wall portion 44, and therefore, the ejector pin seats 93, 94 are thicker than the ejector pin seats 96.

Operations and Effects of Vehicle Body Structure Member

Next will be described operations and effects of the vehicle body structure member according to the present embodiment.

In the present embodiment, the rear-floor side member 20 illustrated in FIG. 2 is formed by aluminum die-casting. Generally, a die-casting member formed by die-casting has high design flexibility, and therefore, the die-casting member is formal such that some parts are formed to be thick so that high rigidity is obtained. However, when the thickness is thickened, the weight of the vehicle increases.

On this account, in the present embodiment, in the rear-floor side member 20, the longitudinal ribs 66, 78, 86 and the like extending along the vehicle up-down direction and the cross ribs 68, 80, 92 and the like extending along the vehicle front-rear direction are provided between the side wall portion 42 and the side wall portion 44 provided to face each other, so as to reinforce the rear-floor side member 20 with a minimum thickness.

Hereby, in the present embodiment, the rigidity of the rear-floor side member 20 improves, and when a collision load is input into the rear-floor side member 20 along the vehicle front-rear direction, the rear-floor side member 20 can be restrained from bending and deforming.

Figure 5:
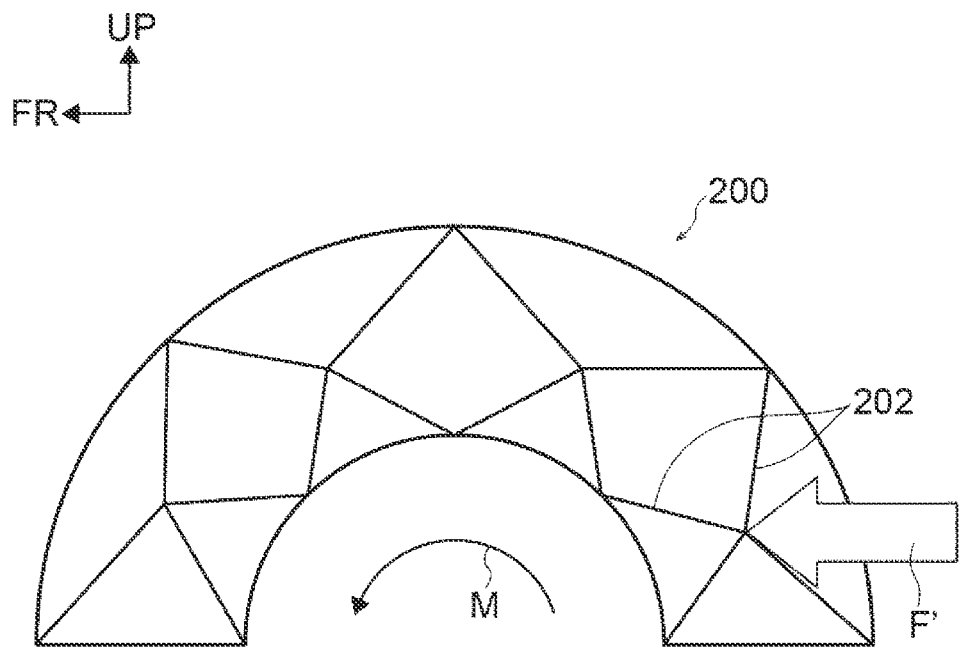
FIG. 5 is a side view illustrating a comparative example and corresponding to FIG. 4.

Further, in the present embodiment, the cross ribs 68, 80, 92 and the like are extended along the input direction (the vehicle front-rear direction) of a collision load. As a comparative example, the following discusses a case where ribs 202 are extended in directions crossing the input direction (the vehicle front-rear direction) of a collision load F' in an arch-shaped rear-floor side member 200, as illustrated in FIG. 5, for example. When the collision load F' is input into the rear-floor side member 200 and a bending moment M is generated in the rear-floor side member 200, the rear-floor side member 200 might bend and deform, so that a collision energy might not be absorbed sufficiently. Note that FIG. 5 is a schematic view schematically illustrating a side view of the rear-floor side member 200.

Figure 4:
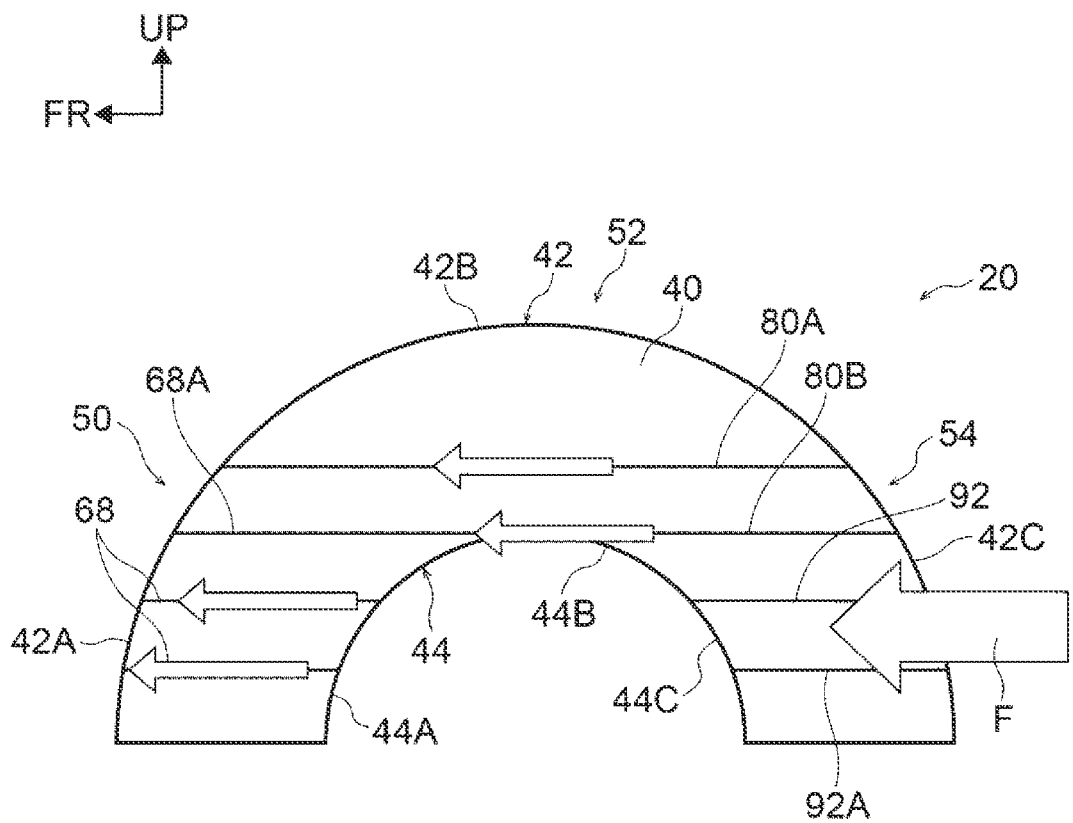
FIG. 4 is a side view schematically illustrating the rear-floor side member illustrated in FIG. 2.

In contrast, as illustrated in FIGS. 3, 4, in the present embodiment, the cross ribs 68, 80, 92 and the like provided in a standing manner from the inner wall portion 40 of the rear-floor side member 20 are extended along the input direction (the vehicle front-rear direction) of a collision load F in the arch-shaped rear-floor side member 20, as described above.

Here, the uppermost cross rib (rib) 68A among the cross ribs 68 is disposed to extend from the side wall portion 42A of the rear-floor side member front part 50 to the side wall portion 44B of the rear-floor side member central part 52. Further, the cross rib (rib) 80B placed in the center among the cross ribs 80 is disposed to extend from the side wall portion 44B of the rear-floor side member central part 52 to the side wall portion 42C of the rear-floor side member rear part 54.

On this account, in the rear-floor side member 20, when the collision load F is input along the vehicle front-rear direction, the collision load F is transmitted from the side wall portion 42C of the rear-floor side member rear part 54 to the side wall portion 44B via the cross rib 80B and then transmitted to the side wall portion 44A via the cross rib 68A through the side wall portion 44B. Further, at this time, in the other cross ribs 92, 92A provided in the rear-floor side member rear part 54, the collision load F is transmitted to the side wall portion 44C and then transmitted to the side wall portion 44A via the cross ribs 68 through the side wall portion 44B.

That is, the cross ribs 68, 80, 92 and the like are extended along the input direction of the collision load F, and therefore, when the collision load F is input into the rear-floor side member 20, the collision load F is transmitted along the cross ribs 68, 80, 92 and the like (more strictly, in order of the cross ribs 92, the cross ribs 80, and the cross ribs 68), so that the cross ribs 68, 80, 92 and the like can be axially compressed.

As such, when the cross ribs 68, 80, 92 and the like are axially compressed, a collision energy is effectively absorbed due to deformation (plastic deformation and plastic deformation) of the cross ribs 68, 80, 92 and the like in the course of axial compression of the cross ribs 68, 80, 92 and the like. Hereby, it is possible to absorb a larger collision energy by a predetermined stroke. To pull it the other way, it is possible to absorb a collision energy by a short stroke, thereby making it possible to prevent even an aluminum die-casting that is less ductile than steel sheet from being broken. Note that FIG. 4 is a schematic view schematically illustrating the side view of the rear-floor side member 20 illustrated in FIG. 2.

Further, in the present embodiment, the side wall portions 42, 44 are further provided such that the side wall portions 42, 44 are provided in a standing manner from the outer edges of the inner wall portion 40 of the rear-floor side member 20 and are connected to the cross ribs 68. Hereby, the rear-floor side member 20 is further reinforced, so that the rigidity of the rear-floor side member 20 can be improved. Note that the side wall portions 42, 44 may not necessarily be provided.

Further, in the present embodiment, the cross ribs 68A, 80B are continued with the side wall portion 44 along the vehicle front-rear direction. Hereby, the cross rib 68A, the side wall portion 44, and the cross rib 80B are integrated with each other in the vehicle front-rear direction so as to serve as a part of a load transmission member.

When the cross rib 68A, the side wall portion 44, and the cross rib 80B are continued along the vehicle front-rear direction as such, the side wall portion 44 can double as parts of the cross ribs 68A, 80B. Hereby, although not illustrated in the figure, it is not necessary to provide any new rib in comparison with a case where a rib is provided separately from the side wall portion 44, so that the rear-floor side member 20 can be accordingly reduced in weight.

Further, problems caused in forging by providing a new rib, e.g., a problem of securing of a cooling space on a die side, a problem of misrun on the rear-floor side member 20 side, and the like, do not occur. Note that, depending on the shape or the like of the rear-floor side member 20, the cross ribs 68A, 80B may not necessarily be continued with the side wall portion 44 along the vehicle front-rear direction.

In the meantime, as illustrated in FIG. 3, in the present embodiment, the cross rib 68A is placed above the centroid O1 of the section at the predetermined position X1 along the vehicle front-rear direction (the region A) on the rear-floor side member front part 50 side of the rear-floor side member 20. Further, in the rear-floor side member central part 52, the cross rib 80A is placed below the centroid O2 of the section at the predetermined position X2 along the vehicle front-rear direction (the region B). Further, on the rear-floor side member rear part 54 side, the cross rib 80B is placed above the centroid O3 of the section at the predetermined position X3 along the vehicle front-rear direction (the region C).

The rear-floor side member 20 has an arch shape curving along the vehicle up-down direction. That is, the rear-floor side member front part 50 and the rear-floor side member rear part 54 of the rear-floor side member 20 are placed below the rear-floor side member central part 52 in the vehicle up-down direction.

On this account, as described above, on the rear-floor side member front part 50 side of the rear-floor side member 20, the cross rib 68A is placed above the centroid O1 of the section at the predetermined position X1 along the vehicle front-rear direction, and on the rear-floor side member rear part 54 side, the cross rib 80B is placed above the centroid O3 of the section at the predetermined position X3 along the vehicle front-rear direction. In the meantime, in the rear-floor side member central part 52, the cross rib 80A is placed below the centroid O2 of the section at the predetermined position X2 along the vehicle front-rear direction.

That is, in the present embodiment, in the rear-floor side member 20 having an arch shape curving along the vehicle up-down direction, the height positions of the cross rib 68A, the cross rib 80B, and the cross rib 80A in the vehicle up-down direction are adjusted, respectively, in the rear-floor side member front part 50, the rear-floor side member rear part 54, and the rear-floor side member central part 52 of the rear-floor side member 20. Hereby, the height positions, in the vehicle up-down direction, of the centroids O1, O2, O3 in respective sections of the rear-floor side member 20 in the vehicle front-rear direction can be generally uniform.

Hereby, at the time of a rear collision of the vehicle, it is possible to restrain the occurrence of a bending moment, and further, it is possible to improve load transmission efficiency via the cross ribs 68A, 80A, 80B. Note that this is only to be expected that a rib may be provided in any place other than the region A, the region B, and the region C.

Supplementary Matter of Present Embodiment

In the present embodiment, the rear-floor side member 20 is formed by aluminum die-casting, but the rear-floor side member 20 is not limited to aluminum and may be a die-casting product made of alloy of zinc, magnesium, copper, or the like or may be made of a casting. Further, the rear-floor side member 20 may be formed by molding fiber reinforced resin (FRP).

Further, in the present embodiment, the rear-floor side member 20 has an arch shape curving along the vehicle up-down direction. However, the rear-floor side member 20 may have an arch shape curving along the vehicle width direction, and further, the rear-floor side member 20 may not necessarily have an arch shape.

Figure 6:
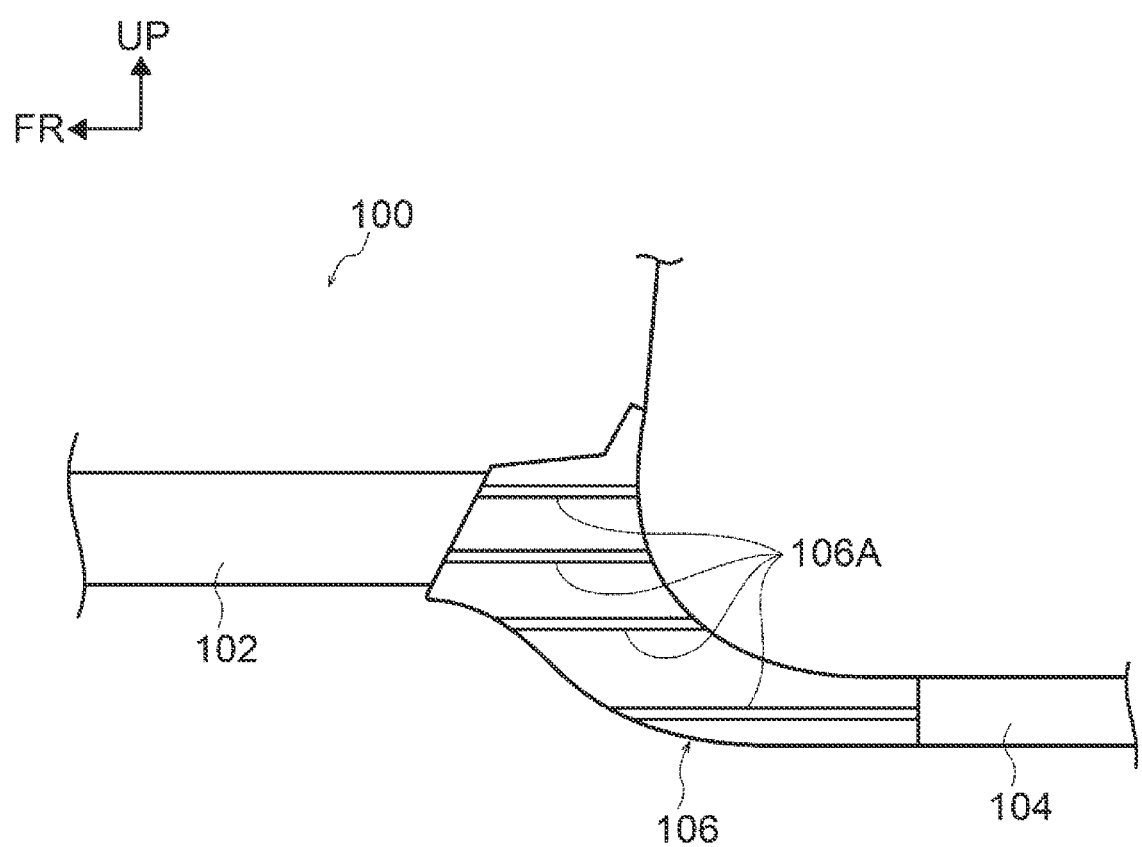
FIG. 6 is a side view illustrating a front side member rear to which the vehicle body structure member according to one embodiment of the present disclosure is applied.

The present embodiment deals with the rear-floor side member 20, but the present embodiment is not limited to this. For example, as illustrated in FIG. 6, the present embodiment may be applied to a from side member rear 106 via which a front side member 102 disposed on the vehicle-body front portion 100 side so as to extend along the vehicle front-rear direction is connected to a floor under reinforcement 104 disposed along the vehicle front-rear direction behind the front side member 102 in the vehicle front-rear direction. In the front side member rear 106, when ribs 106A are extended along the vehicle front-rear direction, it is possible to restrain the occurrence of a bending moment at the time of a front collision of the vehicle, thereby making it possible to improve load transmission efficiency via the ribs 106A.

Further, other than the above, the present disclosure should be a vehicle body structure member. On this account, the present disclosure may be applied to a tunnel portion, the floor cross member 28 (sec FIG. 1), or the like other than the side member.

One embodiment of the present disclosure has been explained as above, but it should be understood that an embodiment of the present disclosure is not limited to the above embodiment, and one embodiment and various modifications may be employed in combination appropriately, or the present disclosure may be performable in various aspects without departing from the scope of the present disclosure.

What is claimed is:

1. A vehicle body structure member molded by a die, the vehicle body structure member comprising:
    a general portion constituting a main part of the vehicle body structure member;
    ribs provided in a standing manner from the general portion and extended along an input direction of a collision load;
    a rear-floor side member having an arch shape curving along a vehicle up-down direction; and
    a side wall portion provided in a standing manner from an outer edge of the general portion and connected to the ribs, wherein:
    the ribs are extended along a vehicle front-rear direction;
    the vehicle body structure member is disposed along the vehicle front-rear direction and has an arch shape curving along the vehicle up-down direction;
    the ribs are placed above a height position, in the vehicle up-down direction, of a centroid of a section of the vehicle body structure member cut along directions crossing the vehicle front-rear direction in each end of the vehicle body structure member in the vehicle front-rear direction; and the ribs are placed below a height position, in the vehicle up-down direction, of a centroid of a section of the vehicle body structure member cut along directions crossing the vehicle front-rear direction in a central part of the vehicle body structure member in the vehicle front-rear direction.

2. The vehicle body structure member according to claim 1, wherein the ribs are extended along a transmission direction of the collision load.

3. The vehicle body structure member according to claim 1, wherein the ribs are continued with the side wall portion along the vehicle front-rear direction.

4. The vehicle body structure member according to claim 1, wherein, in the vehicle front-rear direction, a cross rib in a side member front part and a cross rib in a side member rear part are placed below a cross rib in a side member central part.

5. The vehicle body structure member according to claim 1, wherein, in a front member central part, longitudinal ribs are placed so as to extend radially from generally a center of curvature of a curved portion of a first side wall portion of a rear-floor side member central part.

6. The vehicle body structure member according to claim 5, wherein the longitudinal ribs are disposed to extend from a second side wall portion of the rear-floor side member central part to the first side wall portion of the rear-floor side member central part.

7. A vehicle body structure member molded by a die, the vehicle body structure member comprising:
    a general portion constituting a main part of the vehicle body structure member;
    ribs provided in a standing manner from the general portion and extended along an input direction of a collision load, wherein the vehicle body structure member is disposed along a vehicle front-rear direction and has an arch shape curving along a vehicle up-down direction, the ribs are placed above a height position, in the vehicle up-down direction, of a centroid of a section of the vehicle body structure member cut along directions crossing the vehicle front-rear direction in each end of the vehicle body structure member in the vehicle front-rear direction, and the ribs are placed below a height position, in the vehicle up-down direction, of a centroid of a section of the vehicle body structure member cut along directions crossing the vehicle front-rear direction in a central part of the vehicle body structure member in the vehicle front-rear direction.

8. The vehicle body structure member according to claim 7, wherein the ribs are extended along a transmission direction of the collision load.

9. The vehicle body structure member according to claim 7, wherein, in the vehicle front-rear direction, a cross rib in a side member front part and a cross rib in a side member rear part are placed below a cross rib in a side member central part.

10. The vehicle body structure member according to claim 7, wherein, in a front member central part, longitudinal ribs are placed so as to extend radially from generally a center of curvature of a curved portion of a first side wall portion of the rear-floor side member central part.

11. The vehicle body structure member according to claim 10, wherein the longitudinal ribs are disposed to extend from a second side wall portion of a rear-floor side member central part to the first side wall portion of the rear-floor side member central part.

* * * * *